United States Patent
Tong et al.

(10) Patent No.: US 6,185,077 B1
(45) Date of Patent: *Feb. 6, 2001

(54) SPIN VALVE SENSOR WITH ANTIFERROMAGNETIC AND MAGNETOSTATICALLY COUPLED PINNING STRUCTURE

(75) Inventors: Hua-Ching Tong; Tai Min, both of San Jose, CA (US); Jian-Gang Zhu, Pittsburgh, PA (US); Chih-Huang Lai, HsinChu (TW)

(73) Assignee: Read-Rite Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/227,323

(22) Filed: Jan. 6, 1999

(51) Int. Cl.[7] ................................................. G11B 5/39

(52) U.S. Cl. ................................... 360/324.11; 360/317

(58) Field of Search .............................. 360/113, 324–325, 360/317; 324/252; 338/32 R

(56) References Cited

U.S. PATENT DOCUMENTS

| | | | |
|---|---|---|---|
| 5,465,185 | 11/1995 | Heim et al. | 360/113 |
| 5,508,867 | 4/1996 | Cain et al. | 360/113 |
| 5,583,725 | 12/1996 | Coffey et al. | 360/113 |
| 5,612,098 | 3/1997 | Tan et al. | 427/529 |
| 5,696,654 | 12/1997 | Gill et al. | 360/113 |
| 5,701,222 | 12/1997 | Gill et al. | 360/113 |
| 5,701,223 | 12/1997 | Fontana et al. | 360/113 |
| 5,705,973 | * 1/1998 | Yuan | 360/113 |
| 5,717,550 | 2/1998 | Nepala et al. | 360/113 |
| 5,742,162 | * 4/1998 | Nepela | 324/252 |

* cited by examiner

Primary Examiner—A. J. Heinz
(74) Attorney, Agent, or Firm—Mark Lauer

(57) ABSTRACT

A stable pinned structure for a magnetoresistive sensor includes a pair of ferromagnetic layers sandwiched about an antiferromagnetic layer, the ferromagnetic layers having substantially opposite magnetic directions magnetostatically coupled and pinned by the antiferromagnetic layer. A free layer of ferromagnetic material has a magnetic direction that can rotate in the presence of an applied magnetic field so that the field can be sensed. A second free layer may be provided, such that the free layers are sandwiched about the pinned structure, with the sensor configured for amplifying signals and minimizing common mode noise.

22 Claims, 2 Drawing Sheets

SPIN VALVE SENSOR WITH ANTIFERROMAGNETIC AND MAGNETOSTATICALLY COUPLED PINNING STRUCTURE

TECHNICAL FIELD

The present invention relates to electromagnetic transducers and sensors, and particularly to magnetoresistive sensors.

BACKGROUND

In the field of magnetic heads for disk drives, large advances in signal sensitivity have been made in recent years with the employment of magnetoresistive sensors. Such sensors utilize elements having a resistance to electrical conduction that changes in response to an applied magnetic field, in order to read signals such as magnetic patterns on a disk. Generally such elements comprise at least one thin layer of ferromagnetic material that is magnetized in a reference direction in the absence of an applied magnetic field. As such a sensor is exposed to an applied magnetic field, the magnetization direction of that layer changes from the reference direction, and the resistance to electrical current also changes, which is measured as a signal. Various mechanisms are known for establishing the reference direction and signal bias, including the use of a permanent magnet, canted current, soft adjacent layer or an antiferromagnetic pinning layer.

Magnetoresistive sensors can include anisotropic magnetoresistive elements, giant magnetoresistive elements or spin valve elements. Spin valve sensors conventionally employ a pinned magnetic layer separated from a free magnetic layer by a conductive spacer layer. When the magnetization of the free layer is parallel to that of the pinned layer, it is believed that parallel electron spins of the magnetic layers allow conduction to occur more easily than when the magnetizations are not parallel. The magnetization of the pinned layer is conventionally held fixed by an antiferromagnetic layer that adjoins the pinned layer.

Unless the pinning force is quite strong, however, the applied magnetic field can alter the direction of magnetization of the pinned layer as well as rotating the free layer magnetization, denigrating signal resolution. Moreover, the coupling between the pinned and pinning layers becomes weaker at higher temperatures, exacerbating the problem of having a pinned layer with a magnetization that may not be fixed. Resistive heating of the sensor during operation can lead to such a breakdown. Further, a breakdown of coupling at elevated temperatures can allow a shift in the direction of magnetization of the pinned layer upon cooling, leading to further problems in reading and interpreting signals. Such a shift can also mischaracterize servo tracking information, causing heads including the sensors to have offtrack errors.

Another form of pinning that has been proposed is to use a balanced pair of oppositely magnetized layers with an extremely thin (a few angstroms thick) layer of a noble metal (ruthenium) sandwiched between the oppositely magnetized layers. This balancing can reduce the magnetic moment felt by the pair of magnetic layers compared with the moment that would be felt by only one of the magnetic layers. An antiferromagnetic layer adjoins one of the magnetized layers for pinning the sandwich. The necessity of forming extra layers, one of which must be as thin as a few atomic layers of ruthenium, however, makes large scale manufacture of this proposal extremely difficult.

SUMMARY OF THE INVENTION

We have discovered that a ferromagnetic layer pinned by an antiferromagnetic layer may not form a single domain but rather a number of microdomains. These microdomains generate signal noise, which increases along with temperature. Moreover, magnetic randomization can occur over time in the edge of the pinning layer closest to the disk, the randomization believed to be caused by repeated exposure to magnetic signals from the disk. Unfortunately, signals pass through that edge before propagating through the rest of the sensor, magnifying any defects such as randomization that are present in the edge.

The present invention provides an improved pinning structure for a magnetoresistive sensor. The improved pinning structure includes a pair of ferromagnetic material layers sandwiched about an antiferromagnetic material layer. The ferromagnetic material layers have magnetizations that are pinned in substantially opposite directions from each other, creating a stable, magnetostatically coupled structure. Moreover, the pinning of these ferromagnetic material layers by the interposed antiferromagnetic material layer is enhanced by the interaction of each major surface of the antiferromagnetic material layer with a bordering major surface of the adjacent ferromagnetic material layer. The large surface area that is pinned and the magnetostatically coupled layers synergistically reinforce each other in forming an inherently stronger pinned structure than is conventional. The problems that have been discovered with regard to edge effect randomization are ameliorated with this stable pinning structure, so that the magnetization along the edge of each pinned layer is held perpendicular to that layer, enhancing sensor output.

With the ferromagnetic material layers formed to substantially equal size and shape, the magnetic moments of each of the ferromagnetic material layers are balanced, so that the structure may experience relatively little torque in response to an applied magnetic field. Such a structure has a further advantage of being less susceptible to loss of pinning at elevated temperatures. In addition, should such loss of pinning occur at extreme temperatures, the stable pinning structure of the current invention can revert to its initial magnetization upon cooling, without shifting of the magnetization that occurs with conventional devices. Furthermore, the invention relaxes the stringent manufacturing tolerances required by some prior art proposals.

Although the improved pinning structure of the present invention can be employed with various forms of magnetoresistive sensors or other devices, particular utility is found with a spin valve sensor that has a free layer separated from one of the pinned layers by a conductive, nonmagnetic layer. Additionally, a dual stripe sensor that reduces common mode noise can be formed around the stable pinned structure.

DESCRIPTION OF THE INVENTION

Figure 1:
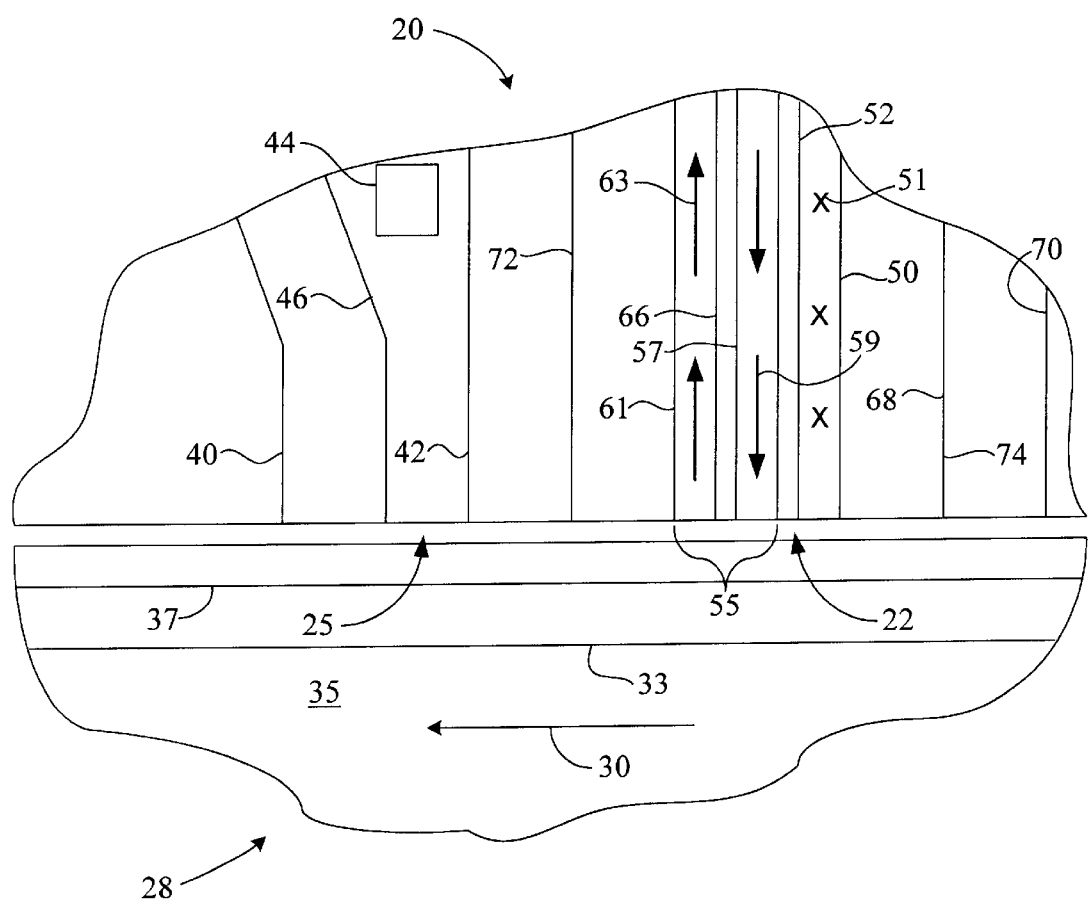
FIG. 1 is a cross-sectional view of a portion an information storage and retrieval system of the present invention including a stable pinned structure for a magnetoresistive sensor.

FIG. 1 shows a portion of a magnetic head 20 including a magnetoresistive sensor 22 and an optional inductive write element 25. The head 20 is shown in operation adjacent to a portion of a medium 28, such as a disk or tape, that is moving relative to the head as shown by arrow 30. The medium 28 has a media layer 33, which can be written into magnetic bits by the write element 25, the bits being read by the sensor 22. The media layer 33 is formed on a medium substrate 35 and may be covered with a protective layer 37. The medium 28 may include a plurality of layers that for conciseness are not shown, such as seed layer or coupling layers.

The write element 25 includes a first poletip 40 and a second poletip 42 which are part of a loop of magnetically permeable material that is inductively coupled to a conductive coil 44 having numerous windings, of which only a single cross section is apparent in the portion of the head 20 depicted in FIG. 1. The poletips 40 and 42 are separated by an amagnetic gap 46, so that when an electrical current in the coil 44 induces magnetic flux around the loop, some of the magnetic flux flows across the poletips to the media layer 33, thereby magnetizing a portion of the medium. Magnetized portions of the medium can be read with the MR sensor 22.

The sensor 22 includes a ferromagnetic free layer 50 that has a magnetization direction pointing into the plane of FIG. 1 in the absence of an applied magnetic field, as shown by X-marks 51. Adjoining the free layer 50 is an electrically conductive, nonmagnetic spacer layer 52, which adjoins a pinned structure 55 having a strongly fixed magnetization direction. The pinned structure 55 includes a first ferromagnetic layer 57 with a downward magnetization direction, as shown by arrows 59, and a second ferromagnetic layer 61 with an upward magnetization direction depicted by arrows 63. Separating the pinned layers 57 and 61 is an antiferromagnetic layer 66 which helps to fix the magnetization directions of the pinned layers. Formation of the pinned layers and antiferromagnetic layer can be accomplished as described in U.S. Pat. No. 5,612,098 to Tan et al., which is incorporated by reference herein. Another ferromagnetic layer 68 shields the sensor 22.

During operation of the sensor 22, an electrical current is flowed through the conductive layer 52 and the resistance to that current is measured. Electron scattering surfaces are believed to exist at borders of the conductive layer 52 with the free layer 50 and with the first pinned layer 57, so that conduction electrons of the current can flow to varying degrees through the first pinned layer and the free layer. A magnetic field from a bit in the medium 28 can rotate the magnetization of the free layer to be more or less aligned with the downward magnetization of adjacent pinned layer 57, causing resistance to the current to be decreased or increased, respectively. In this manner the sensor 22 can read the magnetization pattern of the medium.

The pinning of the layers 57 and 61 by the antiferromagnetic layer 66 has an advantage in that both major surfaces of the antiferromagnetic layer act to pin a ferromagnetic layer. It is believed pinning of a ferromagnetic layer by an adjoining antiferromagnetic layer primarily results from interaction between the adjoining surfaces of the ferromagnetic and antiferromagnetic layers. Sandwiching the antiferromagnetic layer between a pair of pinned layers essentially results in twice that surface area interaction. In addition, the magnetostatic coupling of the oppositely magnetized pinned layers enhances the stability of both pinned layers and reinforces the antiferromagnetic pinning. Forming the antiferromagnetic layer that separates the pinned ferromagnetic layers to a thickness of as little as a few atomic layers is not critical to achieve this magnetostatic coupling, unlike some prior art devices. Instead, the antiferromagnetic layer may have a thickness ranging from about 50 Å to 300 Å. Further, since the antiferromagnetic layer is essentially surrounded by the magnetic field of the coupled, pinned layers, edge instability is dramatically reduced in the ferromagnetic layers.

The head 20 may be formed on a head substrate 70 along with thousands of similar heads, with a portion of the head substrate remaining attached to the read and write elements 22 and 25. The portions of the head which are nonmagnetic and nonconductive, such as layer 72 separating the read and write elements 22 and 25 and layer 74 disposed adjacent shield 68, may be formed of materials such as alumina ($Al_2O_3$), silicon carbide (SiC), silicon dioxide ($SiO_2$), silicon nitride ($Si_3N_4$) or diamond-like carbon (DLC). The sensor 22 may have additional layers besides those shown in FIG. 1, the additional layers not shown for clarity and conciseness. For example, each of the pinned layers 57 and 61 may actually include a plurality of ferromagnetic layers of nickel-iron (NiFe) and cobalt (Co), and the free layer 50 may comprise similar plural layers. The pinned layers may also adjoin each other at an edge. The antiferromagnetic layer may be formed of various alloys of manganese (Mn) or other metals, such as FeMn, IrMn, PtMn, PtPdMn, NiMn, NiO, NiCoO or other known antiferromagnetic materials. The nonmagnetic spacer layer 52 may be formed of copper (Cu), silver (Ag), gold (Au) or platinum (Pt), for instance, or other noble metals. The sensor may be removed from the medium-facing surface, for example with a diamond-like carbon coating.

Figure 2:
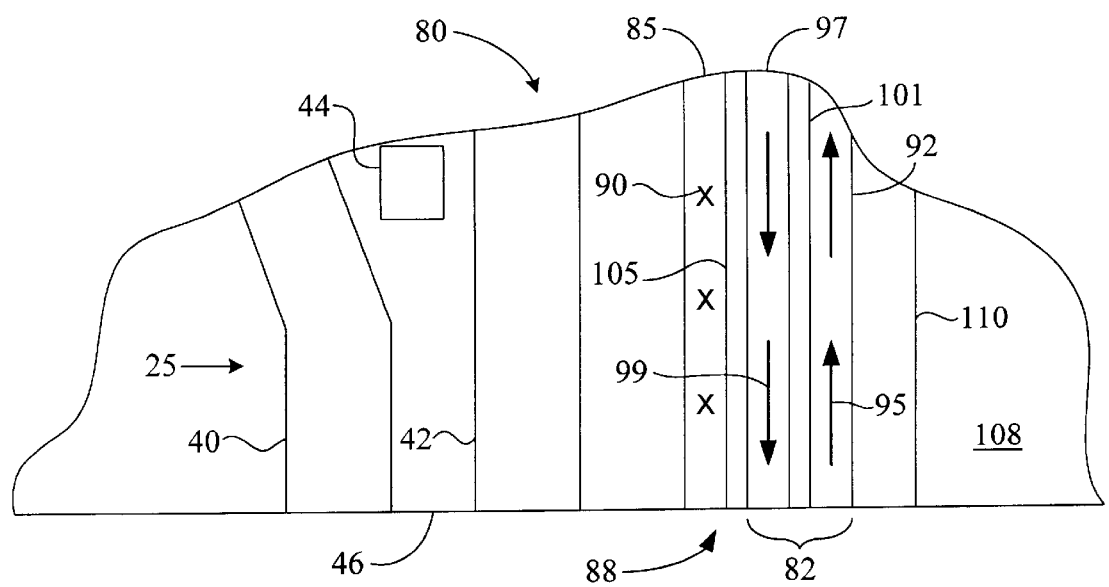
FIG. 2 is a cross-sectional view of a second embodiment of a stable pinned structure for a magnetoresistive sensor.

FIG. 2 shows a portion of a head 80 in which a stable pinned structure 82 has been formed prior to the formation of a ferromagnetic free layer 85 for a magnetoresistive sensor 88. The ferromagnetic free layer 85 has in this example a magnetization direction pointing into the plane of FIG. 2 in the absence of an applied magnetic field, as shown by X-marks 90. The pinned structure consists of a first ferromagnetic layer 92 with an upward magnetization direction, as shown by arrows 95, and a second ferromagnetic layer 97 with a downward magnetization direction depicted by arrows 99. Separating the pinned layers 92 and 97 is an antiferromagnetic layer 101 which fixes the magnetization directions of the pinned layers. Disposed between the pinned structure 82 and the free layer 85 is an electrically conductive, nonmagnetic spacer layer 105. The sensor 88 may be formed directly on a head substrate 108 or a polished layer 110 may be formed on the substrate prior to formation of the pinned structure 82, in order to provide a template for formation of the spin-valve layers. An optional ferromagnetic shield, not shown in this figure, may be formed on substrate 108 prior to formation of layer 110, the shield separated from the pinned structure 82 by layer 110.

Figure 3:
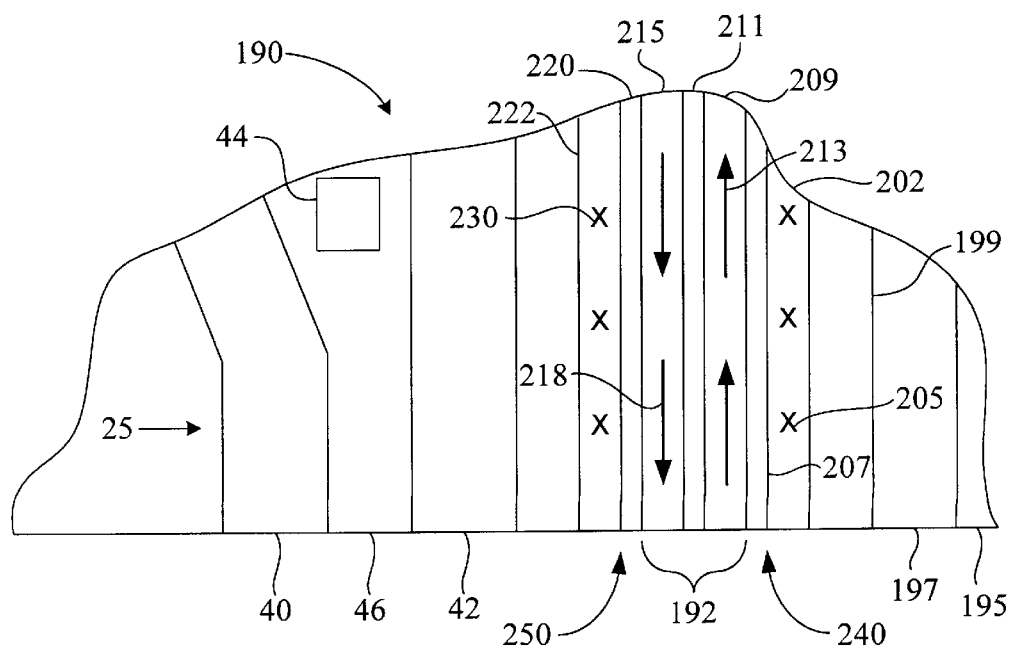
FIG. 3 is a cross-sectional view of a third embodiment of a stable pinned structure for a dual-stripe magnetoresistive sensor.

FIG. 3 shows another embodiment of the present invention including a head 190 with a dual-stripe MR transducer and a multilayer pinned structure 192. Much as before the head is formed on a wafer substrate 195 that remains a part of the head. A first ferromagnetic shield layer 197 is formed on the prepared substrate 195, followed by an nonmagnetic gap layer 199. A first free layer 202 of ferromagnetic material has been formed on the nonmagnetic gap layer 199. The first free layer 202 of ferromagnetic material has a magnetization direction pointing into the plane of the figure in the absence of an applied magnetic field, as shown by X-marks 205. Disposed adjacent to the free layer 202 is a first nonmagnetic conductive spacer layer 207. A first pinned layer 209 of ferromagnetic material adjoins the conductive layer 207, with a nonconductive antiferromagnetic layer 211 adjoining and pinning the first pinned layer, so that the first pinned layer has an upward magnetization direction shown by arrows 213. A second pinned layer 215 of ferromagnetic material adjoins the antiferromagnetic layer 211, the second pinned layer 215 having a downward magnetization direction shown by arrows 218. Disposed adjacent to the second pinned layer 215 is a second nonmagnetic conductive spacer layer 220, which separates the second pinned layer 215 from a second free layer 222. In the absence of a media field the second free layer 222 has a magnetization directed into the plane of the figure, as shown by X-marks 230, that magnetization being free to rotate in the presence of a media field.

Thus the pinned structure of this embodiment includes two ferromagnetic layers 209 and 215 that have magnetic orientations pinned in opposite directions by interspaced antiferromagnetic layer 211, presenting a balanced magnetic moment for the pinned structure 192. A first spin-valve sensor 240 is formed by interaction of the first free layer 202 with the first pinned layer 209 across the first nonmagnetic conductive spacer layer 207. A second spin-valve sensor 250 is formed by interaction of the second free layer 222 with the second pinned layer 215 across the second nonmagnetic conductive spacer layer 220. The magnetization of the first free layer 202 is oriented substantially parallel to that of the second free layer 222, with the free layer magnetizations perpendecular to their respective pinned layers. The sensors 240 and 250 are electrically separated by the nonconducting antiferromagnetic layer 211, which may be formed of NiO or NiCoO for example.

An amplifier is conventionally provided for selectively amplifying media induced signals from the spin-valve sensors 240 and 250, while common mode noise from the two sensors can be cancelled. For example, an increase in temperature of the sensors 240 and 250, which would tend to lower resistance of both sensors equally, does not change the relative input voltages to amplifier, causing no change in output. On the other hand, magnetic signals from bits in the media tend to rotate the magnetization of both free layers 202 and 222 in tandem away from perpendicular to their respective pinned layers 209 and 215. Since the pinned layers are antiparallel and the resistance across each sensor varies as a function of the cosine of the angle between that sensor's free and pinned layer magnetizations, this causes a change in voltage to the inputs of the amplifier which is added and amplified, so that a usable output signal is generated.

What is claimed is:

1. A magnetoresistive sensor for an information storage system comprising:
    a first ferromagnetic layer,
    a second ferromagnetic layer disposed adjacent and substantially parallel to said first ferromagnetic layer,
    an antiferromagnetic layer disposed between said first and second ferromagnetic layers, such that said first and second ferromagnetic layers have magnetizations that are pinned by said antiferromagnetic layer in substantially opposite directions,
    a third ferromagnetic layer disposed adjacent to and exchange coupled with said first ferromagnetic layer, said third ferromagnetic layer having a magnetic orientation that is variable in the presence of an applied magnetic field, and
    a nonconductive layer adjoining said third ferromagnetic layer distal to said first and second ferromagnetic layers, whereby an electric current passing through said third ferromagnetic layer encounters a resistance that varies as a function of said applied field.

2. The sensor of claim 1, wherein said first and second ferromagnetic layers are magnetically coupled in a loop substantially surrounding said antiferromagnetic layer.

3. The sensor of claim 1, further comprising a conductive layer disposed between said third ferromagnetic layer and said first ferromagnetic layer, whereby said magnetoresistive sensor is a spin valve sensor.

4. The sensor of claim 1, wherein said antiferromagnetic layer has a thickness substantially greater than 10 Å.

5. The sensor of claim 1, wherein said first and said second ferromagnetic layer have a substantially equal thickness, length and width.

6. The sensor of claim 1, further comprising a fourth ferromagnetic layer, disposed distal to said third ferromagnetic layer and exchange coupled to said second ferromagnetic layer, said fourth ferromagnetic layer having a magnetic orientation that is variable in the presence of said applied magnetic field, whereby said magnetoresistive sensor is a dual stripe sensor.

7. The transducer of claim 1, wherein said antiferromagnetic layer is nonconductive.

8. A transducer for an information storage system containing a relatively moving magnetic medium, the transducer comprising:
    a nonconductive layer,
    a free layer of ferromagnetic material adjoining said nonconductive layer and having a magnetization direction that changes from a reference direction in response to a magnetic field from the medium,
    a nonmagnetic conductive layer adjoining said free layer,
    a first pinned layer of ferromagnetic material adjoining said nonmagnetic conductive layer, said first pinned layer having a magnetization direction that is substantially unchanged in response to said magnetic field,
    an antiferromagnetic layer adjoining said first pinned layer, and
    a second pinned layer of ferromagnetic material adjoining said antiferromagnetic layer and coupled to said first pinned layer, said second pinned layer having a magnetization direction that is substantially opposite to that of said first pinned layer and substantially unchanged in response to said magnetic field, whereby said first and second pinned layers provide a magnetically stable structure compared to said free layer.

9. The transducer of claim 8, wherein said antiferromagnetic layer has a thickness greater than 10 Å.

10. The transducer of claim 8, wherein said first and second pinned layers are magnetically coupled in a loop substantially surrounding said antiferromagnetic layer.

11. The transducer of claim 8, wherein said antiferromagnetic layer is nonconductive.

12. The transducer of claim 8, further comprising a second free layer of ferromagnetic material separated from said second pinned layer by a second nonmagnetic conductive layer, whereby said magnetoresistive sensor is a dual-stripe spin-valve sensor.

13. The transducer of claim 12, wherein said antiferromagnetic layer is nonconductive.

14. The transducer of claim 12, wherein said free layers are substantially parallel to each other and substantially perpendicular to said pinned layers.

15. A magnetoresistive sensor for an information storage system comprising:
    a sense layer of ferromagnetic material having a magnetic direction that changes due to an applied magnetic field,
    a reference structure exchange coupled to said sense layer and containing an antiferromagnetic layer and a pair of pinned layers, said pinned layers adjoining opposed major surfaces of said antiferromagnetic layer and having substantially opposite magnetic directions that are substantially unchanged in the presence of said applied field, and a nonconductive layer adjoining said sense layer distal to said reference structure.

16. The sensor of claim 15, wherein said magnetic direction of said sense layer is substantially perpendicular to that of said pinned layers in the absence of said applied magnetic field.

17. The sensor of claim 15, wherein said pinned layers are magnetically coupled in a loop substantially surrounding said antiferromagnetic layer.

18. The sensor of claim 15, wherein said antiferromagnetic layer has a thickness greater than 10 Å.

19. The sensor of claim 15, wherein said antiferromagnetic layer is nonconductive.

20. The sensor of claim 15, further comprising a second sense layer exchange coupled to said reference structure, whereby said thin film structure functions as a dual-stripe magnetoresistive sensor.

21. The sensor of claim 20, wherein said sense layers have substantially parallel magnetic directions in the absence of said applied magnetic field.

22. The sensor of claim 20, wherein said antiferromagnetic layer is nonconductive.

* * * * *